United States Patent [19]

Federici et al.

[11] Patent Number: 4,851,475
[45] Date of Patent: Jul. 25, 1989

[54] HIGH-FUNCTIONALITY COMPOSITIONS BASED ON FLUORINATED AND SILANIZED POLYISOCYANATES AND VARNISHES PREPARED THEREFROM

[75] Inventors: Franco Federici, Busto Arsizio; Giorgio Pin, Olgiate Olona; Ennio Cozzi, Cantalupo; Aldo Trovati, Novara, all of Italy

[73] Assignee: Montedison S.p.A., Milan, Italy

[21] Appl. No.: 69,028

[22] Filed: Jul. 1, 1987

[30] Foreign Application Priority Data

Jul. 3, 1986 [IT] Italy ................................ 21020 A/86

[51] Int. Cl.$^4$ ................................................ C08F 8/00
[52] U.S. Cl. .................................... 525/104; 525/409; 525/474; 528/18; 528/19; 528/15; 528/21; 528/28; 528/29; 524/860
[58] Field of Search ................ 528/28, 29, 15, 18, 528/21, 19; 525/409, 474, 104; 524/860

[56] References Cited

U.S. PATENT DOCUMENTS

| | | | |
|---|---|---|---|
| 3,671,497 | 6/1972 | Low et al. | 260/77.5 |
| 3,972,856 | 8/1976 | Mitsch et al. | 260/77.5 |
| 4,098,742 | 7/1978 | Mueller | 260/29.2 |
| 4,132,681 | 1/1979 | Field et al. | 525/409 |
| 4,374,209 | 2/1983 | Rowlands et al. | 525/409 |
| 4,407,997 | 10/1983 | Sghibartz | 524/202 |
| 4,529,743 | 7/1985 | Kollmeier et al. | 528/29 |

*Primary Examiner*—Melvyn I. Marquis
*Attorney, Agent, or Firm*—Stevens, Davis, Miller & Mosher

[57] ABSTRACT

High-functionality compositions based on fluorinated and silanized polyisocyanates, prepared by reacting a hydroxy-terminated perfluoropolyether having an average molecular weight ranging from 500 to 7000 and a silico-carbinol having an average molecular weight ranging from 500 to 7000, with an organic diisocyanate and a polyol having a functionality of at least 3. Varnishes containing said compositions based on fluorinated and silanized polyisocyanates, having a high functionality.

22 Claims, No Drawings

HIGH-FUNCTIONALITY COMPOSITIONS BASED ON FLUORINATED AND SILANIZED POLYISOCYANATES AND VARNISHES PREPARED THEREFROM

DESCRIPTION OF THE INVENTION

The present invention relates to high-functionality cospositions based on fluorinated and silanized polyisocyanates.

More particularly, the invention relates to said compositions and to varnishes and paints prepared therefrom.

The use of urethane polymers or of polyisocyanates as base products for preparing varnishes and paints is known in the art.

Generally, varnishes and paints consist of a solvent/dispersing agent base in which a polymeric product and, optionally, additives, such as pigments, anti-corrosion agents, antifouling agents, etc., are dissolved or dispersed, the function thereof being that of improving the varnish and paint properties when applied as a film or a surface coating.

Examples of polymeric products are the urethane resins, acrylic resins, polyvinylchloride, etc.

The polyurethane or polyisocyanate paints and varnishes have the property of hardening during the evaporation of the solvent or of the dispersing agent, and consequently of forming a surface coating which, besides adhering well to the surface on which it is applied, shows an excellent resistance to weathering agents as well as excellent physical characteristics such as hardness, water-repellency, stability to ultraviolet radiations, etc.

An important field of use for the paints, in particular for those based on polyurethane resins, is represented by the marine sector, where the paint, besides exhibiting excellent anticorrosion coating properties, must also exert an antifouling activity in order to prevent any animal and/or vegetable forms from forming and growing on the hulls of boats and ships. Such vegetable/animal forms give rise to serious drawbacks because they not only damage the protective film or the paint which coats the keel, but they also cause a high friction which remarkably influences the fuel consumption.

To remove such vegetable or animal forms, boats of any size are sheltered in dry docks, where they are freed from such foulings and are painted again.

Such maintenance work, besides being expensive in itself, requires also long working times which, in the case of commercial boats, detrimentally affect the running costs.

As regards racing boats, in particular, the presence of such animal/vegetable forms, with the consequent surface roughness of the keel, adversely affects the sports purposes, i.e., the speed. In fact, for this type of boat, already the protective film itself must exhibit a coefficient of friction close to that of very smooth surfaces, for example glass or mirror-like aluminum, in order to reduce as much as possible the resistance to the advancing of the hull in the water.

Thus, there were proposed, and broadly described in the literature, paints mainly intended for marine use, or resins and polymers as basic products for preparing them, by means of which the attempt was made to solve the foregoing problems and above all to reduce and simplify the maintenance work for cleaning and repainting large size boats.

Some of these paints, such as, e.g., those described in European patent application No. 46,354 or in U.S. Pat. No. 4,407,997, contain biocides; in most cases biocides based on copper or tin, which are released very slowly according to different mechanisms and which inhibit the growth of vegetable and/or animal forms on the arts on which they are applied.

These paints, however, suffer from the drawback of being effective only over a limited period of time and by having a biocide-polluting action on the sea flora and fauna.

As an alternative to paints containing antifouling additives, paints have been proposed based on fluorinated resins and polymers. Such fluorinated resins, in particular fluorinated polyurethane resins such as, for example, those described in U.S. Pat. No. 4,132,681, permit one to prepare paints endowed with good coating properties and which, when applied on boat hulls, permit easy removal of the vegetable/animal scales formed thereon. This latter characteristic can be improved by adding to such paints powdered fluorinated polymers, such as tetrafluoroethylene, which, as is known, is a material having excellent antiadhesion properties. Also, in this case, however, the suggested solution is something less than satisfactory becauseit does not prevent the growth of such animal and/or vegetable forms.

It has now been discovered in accordance with the present invention that compositions based on fluorinated and silanized polyisocyanates, to be utilized as base polymers for preparing varnishes endowed with high water-repellency, low critical surface tension, and low coefficient of friction, are those having high functionality, obtained by reacting a hydroxy-terminated perfluoropolyether, a silico-carbinol, an organic diisocyanate, and a polyol, preferably of low molecular weight, having a functionality of at least 3.

Thus, it is an object of the present invention to provide high functionality compositions based on fluorinated and silanized polyisocyanates, obtained by reacting a hydroxy-terminated perfluoropolyether ($A_1$) having an average molecular weight ranging from 500 to 7000, of formula

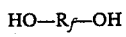

HO—$R_f$—OH and a silico-carbinol ($A_2$) having an average molecular weight from 500 to 7000 of formula

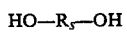

HO—$R_s$—OH with an organic diisocyanate ($A_3$) and an organic polyol ($A_4$) having a functionality of at least 3, in molar ratios $A_1/A_2/A_3/A_4$ ranging from 1/0.07/6/2 to 1/0.15/7/3.5, wherein $R_f$ is a difunctional radical of one of the formulae (I) to (IX):

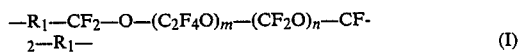

$$-R_1-CF_2-O-(C_2F_4O)_m-(CF_2O)_n-CF_2-R_1- \qquad (I)$$

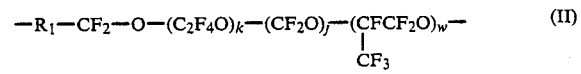

$$-R_1-CF_2-O-(C_2F_4O)_k-(CF_2O)_j-(CFCF_2O)_w- \atop {\displaystyle \qquad\qquad\qquad\qquad\qquad\qquad\qquad\ CF_3}  \qquad (II)$$

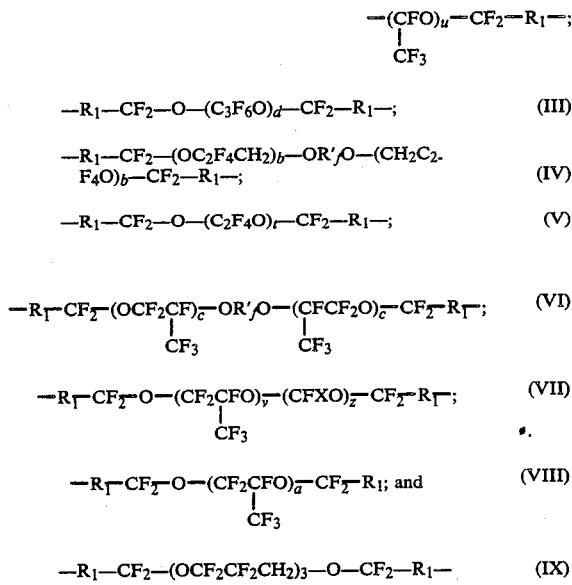

$$-R_1-CF_2-O-(C_3F_6O)_d-CF_2-R_1-; \quad (III)$$

$$-R_1-CF_2-(OC_2F_4CH_2)_b-OR'_f-O-(CH_2C_2F_4O)_b-CF_2-R_1-; \quad (IV)$$

$$-R_1-CF_2-O-(C_2F_4O)_t-CF_2-R_1-; \quad (V)$$

$$-R_1-CF_2-(OCF_2CF)_c-OR'_f-O-(CFCF_2O)_c-CF_2-R_1-; \quad (VI)$$
       |                    |
       CF$_3$                CF$_3$ $$-R_1-CF_2-O-(CF_2CFO)_v-(CFXO)_z-CF_2-R_1-; \quad (VII)$$
                |
                CF$_3$ $$-R_1-CF_2-O-(CF_2CFO)_a-CF_2-R_1; \text{ and} \quad (VIII)$$
                |
                CF$_3$ $$-R_1-CF_2-(OCF_2CF_2CH_2)_3-O-CF_2-R_1- \quad (IX)$$

with $R_1$ selected from $-(CH_2)_x-$, $-(CH_2O)_yCH_2-$, $-(CH_2)_xOCH_2-$, wherein x, y are integers from 1 to 4; m and n are integers where the ratio m/n is between 0.2 and 2, and preferably between 0.5 and 1.2; $R'_f$ is a perfluoroalkylene radical; X is F or CF$_3$; k, j, w, u, d, b, t, c, v, z, a, e, are integers such as to allow one to obtain the above-said molecular weights; and $R_s$ is a difunctional radical of formula:

$$-R_2-CH_2O+Si(CH_3)_2-O+R_2-CH_2O+_{\overline{r-1}g-1}Si(CH_3)_2-O+R_2-CH_2O+_{\overline{r-1}}R_2-CH_2- \quad (X)$$

with $R_2$ being an alkylene radical containing from 1 to 5 carbon atoms; in which r is an integer from 2 to 6; and g is an integer from 4 to 10.

In the reaction one may employ perfluoropolyether/silico-carbinol weight ratios selected over very wide ranges; however, the preferred ratios are from 98/2 to 85/15.

Preferred compositions are those obtained by starting from hydroxy-terminated perfluoropolyethers with an average molecular weight from 1000 to 2500 and from silico-carbinols with an average molecular weight from 1000 to 2500.

Further preferred compositions are those obtained by starting from polyols having a functional group and having a low molecular weight, for example lower than 400; such compositions have an NCO content, calculated on the dry basis, ranging from 1.5 to 8%, and preferably from 3 to 6%.

According to one embodiment of the invention, the compositions of the present invention may be prepared through a two-step process:

(a) in a first step, an organic diisocyanate is reacted with a mixture consisting of 85-98% by weight of hydroxy-terminated perfluoropolyether and 2-15% of silico-carbinol, the reaction temperature being maintained from 40° to 100° C.; and (b) after the end of the reaction, the product so obtained is admixed with the polyol, or a mixture of polyols, having a low molecular weight. Also in this second step, the temperature ranges from 40° to 100° C.

According to another preferred embodiment, the compositions of the present invention may be prepared by a three-step process:

(i) in the first step, the mixture of perfluorinated polyetherdiol and silico-carbinol is first charged into an autoclave with a portion of diisocyanate in order to provide a molar ratio of diisocyanate to the mixture equal to about 2:1;

(ii) in the second step, to the intermediate product so obtained there is added all the low molecular weight polyol; and (iii) in the third step, at the end of the reaction the remaining portion of the diisocyanate is charged.

The reaction temperature in the three steps ranges from 40° to 100° C.

Since the hydroxy-terminated perfluoropolyether is immiscible both in diisocyanate and in silico-carbinol, and the mixing thereof provides a non-homogeneous milky suspension which tends to separate into an upper part (diisocyanate and silico-carbinol) and a lower part (perfluoropolyether), the reaction is conducted in the presence of a solvent. Such solvent, although it dissolves a small amount of perfluorinated polyether diol, enables molecules of the first three reagents to be present in the reaction medium.

The initial NCO-terminated intermediate reaction product is perfectly soluble and able by itself to act as a solvent for the not-yet-reacted perfluoropolyether.

The solvent utilized is compatible with the reaction temperature and is inert with respect to the reagents and to the final reaction product.

Examples of suitable solvents are: dimethylformamide, chlorinated solvents such as trichloroethylene, tetrachloroethane, etc., or organic solvents containing in the molecule an ester-ether group such as polyoxyethylene monoethylether acetate, polyoxyethylene monobutylether acetate, polyoxybutylene monoethylether acetate, polyoxybutylene monobutylether acetate, polyoxyethylene diacetate, polyoxybutylene diacetate, cellosolve acetate, ethylene glycol diacetate, butylene glycol diacetate, etc.

In order to increase the reaction kinetics, it is preferred to operate in the presence of appropriate catalysts.

Examples of such catalysts are: tertiary amines, such as triethylenediamine, N-ethyl-ethyleneimine, tetramethylguanidine, dimethylcyclohexylamine, etc., organometal activators such as dibutyl-tin-dilaurate, tin octoate, cobalt naphthenate, vanadium acetylacetonate, dimethyl-tin-diethylhexanoate, and mixtures thereof.

Preferred catalysts are triethylenediamine and dibutyl-tin-dilaurate.

The catalysts are used in catalyst concentrations, and generally not higher than 0.1% by weight.

Any diisocyanate of general formula:

OCN—R—NCO in which R is selected from alkylene, cycloalkylene, alkylenecycloalkylene or arylene radicals containing from 1 to 20 carbon atoms, may be utilized from preparing the compositions of the present invention. Examples of utilizable diisocyanates are: 2,4-toluenediisocyanate either alone or in admixture with its isomer 2,6-toluene diisocyanate, 4,4'-diphenylmethane diisocyanate, 4,4'-dicyclohexyl-methane-diisocyanate; 1-isocyanate-3-isocyanate-methyl-3,5,5-trimethylcyclohexane (or isophorone diisocyanate); 2,2,4-trimethylhexamethylene-diisocyanate in admixture with its isomer 2,5,5-trimethylhexamethylene-diisocyanate, ethylidene-diisocyanate, butylene-diisocyanate pentamethylene-diisocyanate, cyclohexylene-1,4-diisocyanate, cyclohexylene-1,2-diisocyanate, xylylene-diisocyanate, dichloro-hexamethylene-diisocyanate, dicychlohexyl-4,4'-diisocyanate, 1,2-di(isocyanatomethyl)cyclobutane, 1-methyl-2,4-diisocyanatocyclohexane, 1-methyl-2,6-diisocyanato cyclohexane, etc.; aliphatic diisocyanates containing ether groups such as 1,3-bis-(γ-isocyanatopropoxy)-2,2-dimethylpropane, etc. Among those, the aliphatic diisocyanates, such as isophorone diisocyanate, are preferred.

Any hydroxy-terminated perfluoropolyether of formula:

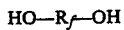

HO—R$_f$—OH may be used for preparing the comositions of the present invention.

As an example may be mentioned α, ω-bis-(hydroxymethyl)-polyoxyperfluoroalkylene, marketed by Montefluos S.p.A., Milan, under the trade name Fomblin Z-DOL.

Any silico-carbinol of formula:

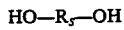

HO—R$_s$—OH may be used for preparing the compositions of the present invention. As an example may be mentioned the product of formula:

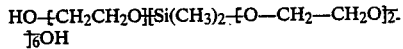

HO—[CH$_2$CH$_2$O]$_6$[Si(CH$_3$)$_2$—[O—CH$_2$—CH$_2$O]$_6$]$_6$OH marketed by Dow Corning under the trade name DOW Q4-3667.

Any polyol having a trivalent or tetravalent functionality, and preferably a low molecular weight, may be utilized in the synthesis of the compositions of the present invention.

Preferred polyols are those having a molecular weight lower than 400, such as trimethylol propane, trimethylol ethane, glycerine, 1,2,6-hexanetriol, and ethoxylated or propoxylated pentaerythritol. Said polyols are utilizable either individually or in admixture with one another.

Compositions based on fluorinated and silanized polyisocyanates having a high functionality in admixture with their reaction solvent are directly utilizable as varnishes.

The varnishes obtained from the high-functionality compositions based on fluorinated and silanized polyisocyanates in admixture with their reaction solvent or further dilutes are another object of the present invention.

As dilution solvents it is possible to use either the reaction solvents themselves or products compatible with them, such as toluene, xylenes, acetates of general formula CH$_3$—COO—R$_3$, with R$_3$ being a linear or branched alkyl radical containing from 2 to 6 carbon atoms, or also ketones of formula R$_4$—CO—R$_5$, with R$_4$ and R$_5$ being linear or branched alkyl radicals containing from 1 to 5 carbon atoms, etc.

To the varnish so obtained one may also add conventional additives such as pigments and fillers; the latter must be inert products, i.e., they must not contain groups that react with the isocyanic groups of the basic composition.

Pigments and fillers are useful to improve the surface characteristics, such as consistency, hardness and stability to moisture, to heat, etc., of the varnish after application and drying thereof on the treated surface. The pigments may be selected from among the natural, synthetic inorganic and synthetic organic pigments.

The polyisocyanate-based compositions utilized for preparing the varnishes of the present invention are sufficiently fluorinated as to be consistent with fillers such as polytetrafluoroethylene, polyfluoroethylene-propylene, etc.

These fillers may be added in large amounts such as, for example, up to 50% by weight of the composition. The fillers, as well as the inert pigments and any other type of additive, are added to the dispersion in very fine particle form, generally having sizes below 100 microns.

The varnishes according to the present invention are characterized by a high water-repellency, a low critical surface tension, and a low coefficient of friction. The fact of being highly water-repellent imparts to the varnishes an excellent antifouling capability.

The varnishes of the present invention, after application and drying, are characterized by the following properties:

contact angle: from 100° to 110°, measured according to method ATICELCA MC 21-72;

coefficient of friction: from 0.1 to 0.3, measured according to ASTM D 1894-78;

Sward hardness: from 40 to 70, measured according to ASTM D 2134-66.

Translation of the method of ATICELLA MC 71-72:

INTRODUCTION (PREMISE)

When a liquid drop of minute volume is put into contact with a flat surface of a substance which does not or does only slowly absorb it, the drop will assume the aspect of a sphere cut at its base. This shape will approach so much the more to a complete sphere the greater the repellence of the surface under test towards the test liquid.

1. OBJECT AND FIELD OF APPLICATION 1.1. In the present method there are prescribed the equipment and testing procedures for determining the superficial wettability of the paper or cardboard, by measuring the angle of the air-water-paper contact.

1.2. The method is applied to papers and cardboards that have a contact angle above 90°.

2. DEFINITION:

2.1. ANGLE OF CONTACT: is the angle, expressed in degrees, formed by the surface of the paper and the tangent of the drop at the points of contact.

2.2. WETTABILITY OF THE PAPER: is defined by the angle of contact between a drop of water and the surface of the paper, measured after an established stretch of time.

3. PRINCIPLE:

3.1. A drop of water of a very small volume is placed on a sheet of paper, whereafter there is measured the angle of contact on the profile of the drop, enlarged by projection onto a screen (see para. 9.1).

4. EQUIPMENT MATERIALS:

4.1. THE TEST EQUIPMENT CONSISTS OF THE FOLLOWING PARTS;

4.1.1. A SUPPORTING TABLE (1), designed so as to allow its adjustment both in the vertical as well as in the horizontal sense, and provided with a fixing system for fixing the test piece.

4.1.2. MICROBURETTE (b) which will allow the formation of drops with a 0.001 ml volume, with an aproximation of ±10%. This microburette may consist of a 1 ml syringe fitted with a needle of circular cross-section, with its end cut orthogonally to the axis of the capillary, and provided with a system allowing micrometrical displacements of the piston of the syringe itself.

4.1.3. SOURCE OF LIGHT (c), fitted with anti-thermic filter (d) and of a collimator lens.

4.1.4 A MICROSCOPE provided with a projection device (e), that will allow 25–30 diameter enlargements and a depth of field of 5 mm.

4.1.5. A FROSTED GLASS SCREEN (f).

4.1.6. A TRANSPARENT PLATE (g), carrying two millimetric scales at right angle to each other, for the measuring of the based and the height of the image of the drop, with 0.5 millimeter subdivisions.

4.2. DISTILLED WATER or water of analogous characteristics.

5. SAMPLING PREPARATION of TEST PIECES:

5.1. The paper, sampled according to the MC 9 method, "Sampling of the paper and cardboard for tests", is conditioned at a temperature and relative humidity according to method MC 20 "Conditioning of paper and cardboard for tests", unless otherwise agreed upon by the parties.

5.2. The test pieces must be cut along a direction at 45° with the machine, by means of a cutter or knife, in such a way as not to deform its edges.

5.3. The test pieces on which to carry out the measurements must be dimensioned to a size fitting the supporting surface. They must be suitably marked to distinguish the two sides.

5.4. The test pieces must not be touched by the hands in those points on which the measurements will be carried out.

6. CONDITIONS TEST PROCEDURES:

6.1. The measurements are carried out in a conditioned environment, conditioned according to the method MC-20 "Conditioning of paper and cardboard for tests", making sure that the distilled water, required for the test, will have reached room temperature.

6.2. The measurement must be carried out on at least 5 test pieces for each side of the sheet, on zones free of superficial irregularities (such as water marks, water lines, folds or creases, etc.).

6.3. Then the supporting flat surface must be controlled as to its leveness.

6.4. The test piece is then placed on the supporting plate so that it will remain flat against it, and under a light tension, in order to avoid the arising of distorsions during the test,.

6.5. The micro-burette is filled with distilled water.

6.6. There is formed a drop of 0.004 ml volume.

6.7. Thereupon the lamp is switched on and the image of the drop is focused onto the screen.

6.8. The drop is then placed on the surface of the paper by suitably lowering the micro-burette and simultaneously is started the second-timer (stopwatch).

6.9. The graduated plate is then superimposed onto the enlarged image of the drop and, after a time of 10 seconds starting from the deposition of the drop, there will be quickly measured the length of the base and the height of the drop itself.

6.10. The lamp is switched off after each measurement, in order to avoid overheatings of the test piece carrying plate.

6.11. Only one single measurement is carried out for each test piece.

7. CALCULATION EXPRESSION OF THE RESULTS:

7.1. The CONTACT ANGLE is calculated by means of the following equation:

$$\alpha = 2 \, \text{arctg} \, \frac{2h}{d}$$

wherein:
$\alpha$ = angle of contact, in degrees;
d = diameter of contact surface of the drop in mm;
h = height of the drop, in millimeters.

7.2. For a fast calculation of $\alpha$ one may use nomogram.

7.3. The value of the found contact angle has been recorded with an approximation of 1°.

8. REPORT OF THE TEST:

8.1. In the Test Report are recorded:
the mean value, expressed in degrees, with an approximation of 1°.
the number of measurements carried out;
the side to which the measurements refer;
the possible changes or modification of what is prescribed in the present method.

9. ATTENTION:

9.1. The method may be extended to other liquids such as for instance inks in aqueous medium, oils, etc., according to mutual agreement between the parties.

For a still better understanding of the present invention some illustrative but not limitative examples are given hereinafter.

EXAMPLE 1

Into a 500-cc reactor equipped with stirrer, thermometer, and reflux cooler there were charged, in a nitrogen atmosphere, 59.56 g (0.0339 moles) of Fomblin Z-DOL having an equivalent weight of 877; 45.83 g (0.206 moles) of isophoronediisocyanate; 20 g of cellosolve acetate, and 0.058 g of dibutyl-tin-dilaurate.

The whole was gradually heated at 73° C. in half an hour. At this temperature the mixture, which was milky at the beginning, became clear. It was heated at 80° C. and this temperature was maintained for 0.5 hours. Then, at 80° C., there were added 4.86 g (0.00242 moles) of Dow Q4-3667 having a molecular weight of 1089, 0.05 g of dibutyl-tin-dilaurate, and 20 g of cellosolve acetate. The whole was maintained at said temperature for 1 hour, then it was cooled to 55° C. whereupon 9.75 g (0.07276 moles) of trimethylolpropane dissolved, at 60° C., in 40.2 g of cellosolve acetate, were added. It was gradually heated at 80° C. in a half an hour and this temperature was maintained for 3 hours and 30 minutes. 40 g of cellosolve acetate were added to bring the dry product to 50%, the solution,which had an NCO content of 2.25% (theoretical value: 2.16%), was cooled to 40° C. and then was discharged.

The resulting reaction mixture was diluted with cellosolve acetate up to 30% by weight of dry substance, and then spread onto a glass plate as a film which, after drying in air for 7 days at room temperature of 25° C., had a thickness of 30 microns.

The characteristics of the resulting varnish are reported in the following Table.

TABLE 1

| Characteristic | Units | Value | Measuring Method |
|---|---|---|---|
| Angle of contact | Degrees | 108 | ATICELCA MC 21-72 |
| Coefficient of friction | — | 0.28 | ASTM D 1894-78 |
| Sward hardness | — | 57 | ASTM D 2134-66 |

EXAMPLE 2

Into a 500-cc reactor equipped with stirrer, thermometer, and reflux cooler there were charged, in a nitrogen atmosphere, 100 g (0.057 moles) of Fomblin Z-DOL having an equivalent weight of 877, 81.3 g (0.365 moles) of isophorone diisocyanate, 50.0 g of cellosolve acetate, and 0.087 g of dibutyl-tin-dilaurate.

The whole was gradually heated at 72° C. in half an hour. At this temperature the mixture, which was milky at the beginning, became clear. It was heated at 80° C. and this temperature was maintained for 0.5 hour. 17.3 g (0.0075 moles) of Dow Q4-3667, having a molecular weight of 1089, 17.5 g of cellosolve acetate, and 0.058 g of dibutyl-tin-dilaurate were then added. The whole was maintained at this temperature for 1 hour, whereupon it was cooled to 55° C. and 17.3 g (0.129 moles) of trimethylolpropane, dissolved in 76.5 g of cellosolve acetate at 60° C., were added. The whole was gradually heated at 80° C. in half an hour and this temperature was maintained for 3.5 hours. The solution had an NCO content of 2.63% (theoretical value: 2.51%). 72 g of cellosolve acetate were added in order to bring the dry substance to 50%, then it was cooled to 40° C. After cooling to 40° C., the solution was discharged.

A varnish was prepared and applied following the procedures of Example 1. The characteristics of such varnish are reported in Table 2.

TABLE 2

| Characteristic | Units | Value | Measuring Method |
|---|---|---|---|
| Angle of contact | Degrees | 105 | ATICELCA MC 21-72 |
| Coefficient of friction | — | 0.19 | ASTM D 1894-78 |
| Sward hardness | — | 52 | ASTM D 2134-66 |

What is claimed is:

1. A high-functionality composition based on fluorinated and silanized polyisocyanates prepared by reacting a hydroxy-terminated perfluoropolyether ($A_1$) having an average molecular weight ranging from 500 to 7000, of the formula:

$$HO-R_f-OH$$

and a silico-carbinol ($A_2$) having an average molecular weight ranging from 500 to 7000, of the formula:

$$HO-R_s-OH$$

with an organic diisocyanate ($A_3$) and an organic polyol ($A_4$) having a functionality of at least 3, in molar ratios $A_1/A_2/A_3/A_4$ ranging from 1/0.07/6/2 to 1/0.15/7/3.5, wherein the $R_f$ radical is selected from the class consisting of those having the formula:

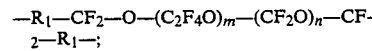
(I)

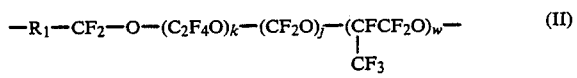
(II)

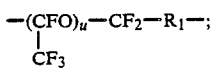

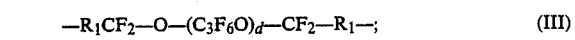
(III)

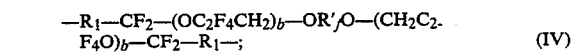
(IV)

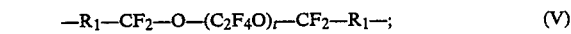
(V)

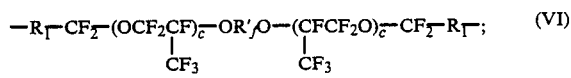
(VI)

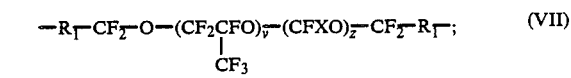
(VII)

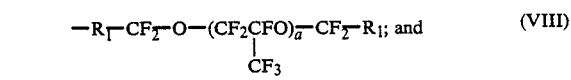
(VIII)

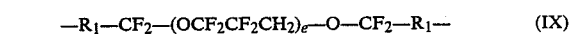
(IX)

with $R_1'$ selected from the class consisting of
$$-(CH_2)_x,$$ (IX)
$$-(CH_2O)_yCH_2-, \text{ and } -(CH_2)_xOCH_2-;$$

x, y are integers from 1 to 4;

m, n are integers having the ratio m/n between 0.2 and 2;

$R'_f$ is a perfluoroalkylene radical;

X is F or $CF_3$; and k, j, w, u, d, b, t, c, v, z, a, e are integers such as to allow one to obtain the above-said molecular weights; and $R_s$ is a difunctional radical of the formula:

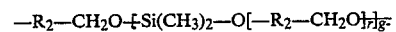

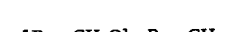

with $R_2$ being an alkylene radical having from 1 to 5 carbon atoms, and in which r is an integer from 2 to 6, and g is an integer from 4 to 10.

2. A composition as defined in claim 1 wherein the ratio of the integers m and n is between 0.5 and 1.2.

3. A composition according to claim 1 or 2, in which the perfluoropolyether/silico-carbinol weight ratio ranges from 98/2 to 85/15.

4. A composition according to claim 1 or 2, in which the hydroxy-terminated perfluoropolyether and the silicocarbinol have average molecular weights ranging from 1000 to 2500.

5. A composition according to claim 1 or 2, wherein the polyol has a functionality equal to 3 and a molecular weight lower than 400.

6. A composition according to claim 1 or 2, wherein the organic diisocyanate is an aliphatic diisocyanate.

7. A composition according to claim 6, wherein the diisocyanate is isophorone diisocyanate.

8. The compositions according to claim 1 or 2, wherein the NCO content of the organic diisocyanate (A₃), calculated on the dry basis, ranges from 1.5 to 8% by mols.

9. A varnish comprising high-functionality compositions based on a fluorinated and silanized polyisocyanate as defined in claim 1 or 2.

10. A varnish according to claim 9, wherein the fluorinated and silanized polyisocyanates are dissolved in a solvent selected from the class consisting of dimethylformamide, chlorinated solvents, and organic solvents containing an ester-ether group in their molecule.

11. A varnish according to claim 9, diluted with a solvent selected from the class consisting of toluene, xylenes, acetates of formula $CH_3-COO-R_3$, with $R_3$ being a straight or branched alkyl radical containing from 2 to 6 carbon atoms, and ketones of formula $R_4-CO-R_5$, with $R_4$ and $R_5$ being linear or branched alkyl radicals containing from 1 to 5 carbon atoms.

12. A varnish according to claim 9, with in addition fluorinated fillers up to 50% by weight of the varnish.

13. A varnish according to claim 12, wherein the fluorinated filler is selected from the class consisting of polytetrafluoroethylene and polyfluoroethylene-propylene.

14. A varnish according to claim 9, having, after drying, the following characteristics: a contact angle from 100° to 110°; a coefficient of friction from 0.1 to 0.3; and a Sward hardness from 40 to 70.

15. A process for preparing a composition as claimed in claim 1, comprising the steps of:
  (a) reacting, at a temperature from 40° to 100° C., a diisocyanate of the formula:

OCN—R—NCO with a mixture consisting essentially of 85-98% by weight of a hydroxy-terminated perfluoropolyether of the formula:

HO—R$_f$—OH and 2 to 15% by weight of a silico-carbinol of the formula:

HO—R$_s$—OH wherein R$_f$ and R$_s$ are as defined in claim 1 and R is selected from the class consisting of alkylene, cycloalkylene, alkylene-cycloalkylene or arylene radicals having from 1 to 20 carbon atoms; and
  (b) reacting the reaction product so obtained with a polyol, or mixture of polyols, having a trivalent or tetravalent functionality, at temperaturess from 40° to 100° C.

16. A process for preparing a composition of claim 1 or 2, comprising the steps of:
  (i) reacting a mixture based on perfluoropolyether and silico-carbinol with a portion of an organic diisocyanate, in order to obtain a molar ratio of diisocyanate in the mixture equal to about 2:1;
  (ii) adding all the organic polyol to the product obtained; and
  (ii) adding, at the end of the reaction, the remaining portion of diisocyanate.

17. A process according to claim 16, wherein the reaction temperature ranges from 40° to 100° C.

18. A process according to claim 15, wherein the reaction is conducted in the presence of a catalyst selected from the class consisting of triethylenediamine, N-ethyl-ethyleneimine, tetramethylguanidine, dimethyl-cyclohexylamine, dibutyl-tin-dilaurate, tin octoate, cobalt naphthenate, vanadium acetylacetonate, dimethyl-tin-diethylhexanote, and mixtures thereof.

19. A process according to claim 18, wherein the catalyst is selected from the class consisting of triethylenediamine and dibutyl-tin-dilaurate.

20. A process according to claim 15, wherein the reaction is conducted in the presenceof a solvent selected from the class consisting of dimethylformamide, chlorinated solvents, and organic solvents containing an ester-ether group in the molecule.

21. A composition as defined in claim 8, wherein the NCO content of the organic diisocyanate (A₃), calculated on the dry basis, ranges from 3 to 6%.

22. A process as defined in claim 15, wherein the organic polyol or mixtures of organic polyols in (b) have a low molecular weight.

* * * * *